United States Patent [19]

Ching

[11] Patent Number: 4,780,517

[45] Date of Patent: Oct. 25, 1988

[54] SURFACTANT-CONTAINING WATER THICKENING POLYMER

[75] Inventor: Ta Yen Ching, Walnut Creek, Calif.

[73] Assignee: Chevron Research Company, San Francisco, Calif.

[21] Appl. No.: 766,863

[22] Filed: Aug. 15, 1985

[51] Int. Cl.$^4$ ............................................. C08F 20/58
[52] U.S. Cl. .................................. 526/240; 526/287; 526/278; 524/547
[58] Field of Search ............... 526/304, 240, 287, 278; 524/547

[56] References Cited

U.S. PATENT DOCUMENTS 3,689,468  9/1972  Cenci et al. ........................ 526/304

Primary Examiner—Joseph L. Schofer
Assistant Examiner—Peter D. Mulcahy
Attorney, Agent, or Firm—S. R. LaPaglia; R. C. Gaffney; C. J. Caroli

[57] ABSTRACT

A water thickening terpolymer of polymerized units of (A) about 50 to 98 mole percent of acrylamide, (B) about 1.9 to 49.9 mole percent of an alkali metal salt or ammonium salt of acrylic acid, and (C) about 0.1 to 5 mole percent of a copolymerizable ionic surfactant containing (1) an acrylyl or methacrylyl group, (2) a pendant hydrophobic group of 6 to 24 carbon atoms, and (3) an ionic polar group.

26 Claims, No Drawings

SURFACTANT-CONTAINING WATER THICKENING POLYMER

BACKGROUND OF THE INVENTION

The present invention relates to water thickening polymers which are useful for increasing the viscosity of an aqueous medium. More particularly, the present invention is concerned with surfactant-containing water thickening polymers having improved salt tolerance.

It is known in the art that the viscosity of an aqueous medium is increased by the addition of water soluble polymeric materials. Previously used thickening materials have included numerous nonionic and/or polyelectrolyte water soluble natural or synthetic polymeric materials, such as gums, sugars, polymers, and the like. Examples of thickening agents include polyacrylamide, acrylamide/sodium acrylate copolymers, sodium polyacrylate, carboxymethyl cellulose, hydroxyethyl cellulose, methyl cellulose, polysaccharides, naturally occurring gums, such as guar gum, chemically modified gums, such as hydroxypropyl guar gum, and biopolymers, such as xanthans derived from biofermentation of carbohydrates.

Accordingly, many industrial applications exist for aqueous media thickened with polymeric materials having water thickening capability. Such a thickened aqueous liquid is particularly useful in connection with fluid drive oil recovery processes, mobility profile modification, processes for drilling, completing or working over wells, or like processes in which a thickened fluid is injected into or brought into contact with a subterranean earth formation.

Water-soluble polymeric materials that are polyelectrolytes are generally efficient as water thickeners. In such materials, recurring units that contain similarly-charged hydrophilic ionic groups cause the dissolved molecules to be extended (and thus to have a large hydrodynamic volume) due to the repulsion between the charged groups. Examples of such polyelectrolyte thickening materials include the Pushers (available from Dow Chemical Company) and the Cyanatrols (available from American Cyanamid Company), comprising partially hydrolyzed polyacrylamide polymers.

However, while ionic water-soluble polymers such as neutralized acrylamide/acrylic acid copolymer, sodium polyacrylate, polystyrene sulfonate and the like are more efficient thickeners in deionized water than their nonionic counterparts, their thickening ability is greatly reduced by the presence of electrolytes such as sodium chloride, calcium chloride and magnesium sulfate in the aqueous medium. Such electrolytes are present in the aqueous media employed in most industrial applications, particularly those requiring the use of ground waters in subterranean formations as in enhanced oil recovery.

One approach to improving the thickening ability of ionic water-soluble polymers is shown in European patent application Publication No. 57,875 A2, published Aug. 18, 1982, which discloses a water thickening composition comprising (1) a water-soluble polymer having pendant hydrophobic groups and formulated to contain ten weight percent external sodium dodecyl sulfate, and (2) a water-dispersible surfactant. As taught in this publication, the water-soluble polymer is preferably a neutralized copolymer of acrylamide, acrylic acid and a hydrophobic monomer such as alkyl methacrylate, especially dodecyl methacrylate. The water-dispersible surfactant utilized is preferably a nonionic surfactant, such as ethoxylated alkyl phenols and ethoxylated fatty alcohols.

Unfortunately, a major disadvantage of two-component polymer/surfactant systems, such as described in European patent application publication No. 57,875 A2, is the tendency of these physical mixtures to undergo chromatographic separation in subterranean oil formations.

U.S. Pat. No. 4,403,152 discloses an aqueous viscosification or thickening agent which is a nonionic copolymer of acrylamide and an alkyl poly(ethyleneoxy) acrylate. Although this patent describes these nonionic polymers as good viscosification agents in salt water, they require high concentrations to be effective. In addition, the presence of ionic charge groups on the polymer backbone renders the copolymer ineffective. By comparison, ionic polyacrylamides in general are efficient water thickeners at low concentrations and therefore are normally preferred in oil recovely applications.

As a result, there exists a need in the art for a one-component polyelectrolyte which not only is an effective water thickener in deionized water but also exhibits improved salt tolerance in brine solutions at a low polymer concentration.

SUMMARY OF THE INVENTION

The present invention provides a water thickening terpolymer of polymerized units of (A) about 50 to 98 mole percent of acrylamide;

(B) about 1.9 to 49.9 mole percent of an alkali metal salt or ammonium salt of acrylic acid; and (C) about 0.1 to 5 mole percent of a copolymerizable ionic surfactant containing (1) an acrylyl or methacrylyl group, (2) a pendant hydrophobic group having 6 to 24 carbon atoms, and (3) an ionic polar group.

Among other factors, the present invention is based on the discovery that certain acrylamide terpolymers containing low levels of a copolymerizable ionic surfactant have surprisingly high viscosities in both fresh water and in brine. This is in marked contrast to conventional acrylamide polyelectrolytes which exhibit good viscosity in fresh water, but lose their viscosity rapidly in brine.

Consequently, another aspect of the present invention relates to a process for recovering oil from a subterranean oil reservoir having one or more production wells and one or more injection wells in contact with said oil reservoir, said process comprising contacting said oil reservoir with an aqueous medium including the water thickening terpolymer described herein, at a concentration effective to increase oil production from said production well during secondary waterflooding or to recover residual tertiary oil when the oil reservoir has been previously flooded

DETAILED DESCRIPTION OF THE INVENTION

The water thickening terpolymers of the present invention are prepared by copolymerizing acrylamide, an acrylic acid salt and a copolymerizable ionic surfactant. Alternatively, acrylic acid may be copolymerized in place of the acrylic acid salt, followed by neutralization of the resulting polymer. The instant terpolymers differ from conventional polyacrylamides in that the terpolymers of the invention incorporate an ionic surfactant as an integral part of the polymer backbone.

Low concentrations of these "built-in" ionic surfactants are capable of forming micelles at high salt concentration in aqueous media which suppresses coiling of the polyelectrolyte, thus retaining the large hydrodynamic volume and solution viscosities.

The present terpolymer will generally incorporate about 50 to 98 mole percent, preferably about 65 to 85 mole percent, of acrylamide, about 1.9 to 49.9 mole percent, preferably about 14.9 to 34.9 mole percent, of acrylic acid salt, and about 0.1 to 5 mole percent, preferably about 0.1 to 1.0 mole percent, of the copolymerizable ionic surfactant.

The charges on the polyelectrolyte can be produced either by copolymerizing acrylic acid, followed by neutralization, or by using an acrylic acid salt. The acrylic acid salts contemplated for use in the present invention include the alkali metal salts and the ammonium salt of acrylic acid. The sodium salt of acrylic acid, namely, sodium acrylate, is preferred. If acrylic acid is employed during polymerization, neutralization can be carried out with any suitable base, such as sodium hydroxide.

The copolymerizable ionic surfactant which is used to form the instant terpolymers possesses certain characteristics. First of all, the surfactant must be capable of incorporating into the polymer backbone, that is, it must be copolymerizable. Thus, the surfactant will generally contain a functional group having terminal olefinic unsaturation, preferably adjacent to a carbonyl, such as an acrylyl or methacrylyl group, which has a high rate of propagation and a low rate of chain termination, for making high molecular weight polymers. Particularly preferred functional groups on the surfactant which are suitable for copolymerization with acrylamide and acrylic acid or its salt include acrylamido and methacrylamido groups.

Secondly, to be an effective surface-active agent, the copolymerizable ionic surfactant will contain a pendant hydrophobic group. In general, the hydrophobic group will have from about 6 to 24 carbon atoms, preferably from about 10 to 18 carbon atoms, either as a single carbon cut or a mixture of carbon numbers. Suitable hydrophobic groups include $C_6$–$C_{24}$ alkyl, $C_7$–$C_{24}$ arylalkyl or alkylaryl, and $C_6$–$C_{24}$ fluoroalkyl. Typical fluoroalkyl groups include $C_6$–$C_{24}$ perfluoroalkyl, preferably $C_7$–$C_{12}$ perfluoroalkyl, and $C_4$–$C_{22}$ perfluoroalkyl ethyl, preferably $C_7$–$C_{12}$ perfluoroalkyl ethyl. A preferred hydrophobic group is $C_6$–$C_{24}$ alkyl, particularly $C_{10}$ to $C_{18}$ alkyl.

Thirdly, the surfactant must be ionic, that is, it must contain an ionic polar group, in order to be brine sensitive. Suitable ionic polar groups include sulfonate, carboxylate and phosphate groups. A preferred ionic polar group is the sulfonate. In general, the ionic surfactant will be in the form of the alkali metal or ammonium salt, preferably the sodium salt. Alternatively, the acid form of the ionic surfactant may be employed during copolymerization. Neutralization of the resulting polymer can then be carried out with a suitable base, such as sodium hydroxide.

Copolymerizable ionic surfactants which are suitable for use in the present invention include 2-acrylamido long-chain ($C_8$–$C_{26}$) carboxylic acid salts, such as sodium 2-acrylamido-lauryl carboxylate. These compounds may be conveniently prepared by acylation of an alphaamino long-chain carboxylic acid of 8 to 26 carbon atoms with acrylyl chloride or methacrylyl chloride under alkaline conditions.

Preferably, the copolymerizable ionic surfactant will be selected from compounds having the formulae:

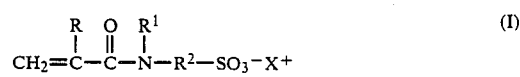

and

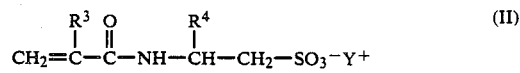

wherein R and $R^3$ are each hydrogen or methyl; $R^1$ is a hydrophobic group selected from the group consisting of $C_6$–$C_{24}$ alkyl, $C_7$–$C_{24}$ arylalkyl, $C_7$–$C_{24}$ alkylaryl, and $C_6$–$C_{24}$ fluoroalkyl; $R_2$ is alkylene of 2 to 4 carbon atoms; $R^4$ is $C_6$–$C_{24}$ alkyl; and X and Y are each hydrogen, alkali metal or ammonium.

Preferably, the hydrophobic group $R^1$ will be $C_6$–$C_{24}$ alkyl, more preferably $C_{10}$ to $C_{18}$ alkyl. $R^4$ is preferably $C_{10}$–$C_{18}$ alkyl. X and Y are each preferably sodium. The ionic surfactants of this type which are especially preferred include sodium acrylamido-N-dodecyl-N-(butyl-4-sulfonate), sodium 2-acrylamido-hexadecyl-1-sulfonate, and sodium 2-methacrylamido-hexadecyl-1-sulfonate.

In general, compounds having the formula

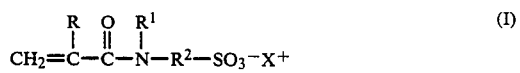

R, $R^1$, $R^2$ and X are as defined above, can be prepared according to the procedures taught in commonly-assigned copending application, Ser. No. 766,861, now abandoned, filed concurrently herewith, entitled "Acrylamido- and Methacrylamido-N-Disubstituted Sulfonic Acids".

Accordingly, surfactant compounds of the above formula wherein $R^2$ is alkylene of 3 to 4 carbon atoms can be prepared by the following procedure. A $C_6$–$C_{24}$ hydro-carbyl-substituted primary amine in at least a molar excess is reacted with a sultone of the formula

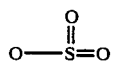

wherein n is 3 to 4. Suitable hydrocarbyl-substituted primary amines include $C_6$–$C_{24}$ alkylamines, $C_7$–$C_{24}$ arylalkylamines, $C_7$–$C_{24}$ alkylarylamines, $C_6$–$C_{24}$ perfluoroalkylamines, and $C_4$–$C_{22}$ 2-perfluoroalkyl ethylamines. (The latter two can be derived from Zonyl fluorocarbons, available from Dupont). The reaction is carried out in a suitable organic solvent such as benzene, methylene chloride, toluene, and the like. The reaction temperature is generally about 0° to 150° C., preferably about 70° to 90° C. The reaction pressure is generally atmospheric.

The resulting sulfonate amine is then reacted with acrylyl chloride or methacrylyl chloride in an aqueous slurry solution at a temperature in the range of about 0° to 25° C., preferably about 5° to 10° C. The sulfonic acid so produced may subsequently be neutralized with sodium hydroxide or a similar suitable base, such as potassium hydroxide, sodium carbonate, potassium carbonate, ammonium hydroxide, and the like. The sodium hydroxide or similar base also acts as an acid scavenger. The acrylamido-N-disubstituted sulfonate salt produced is isolated by precipitation from the aqueous solution.

Surfactant compounds of the above formula wherein $R^2$ is alkylene of 2 carbon atoms can be prepared by reacting beta-aminoethane sulfonate with a $C_6$–$C_{24}$ 1-tosylalkane, such as 1-tosyldodecane, a $C_7$–$C_{24}$ aryl-1tosylalkane, or a $C_6$–$C_{24}$ 1-tosyl-fluoroalkane, followed by acylation with acrylyl chloride or methacrylyl chloride in the presence of an alkaline hydroxide to provide the alkali metal salt of the acrylamido (or methacrylamido) sulfonic acid. If desired, the sulfonate salt may be acidified to the sulfonic acid.

Copolymerizable ionic surfactants which have the formula

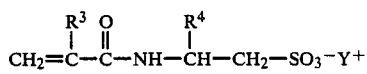
(II)

wherein $R^3$, $R^4$ and Y are as defined above, can be prepared by following the procedure described in West German Offenlegungsschrift (Laid-Open Patent Application) No. DE 3239527, laid open on April 26, 1984.

Following this procedure, a nitrile of the formula

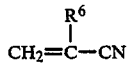

wherein $R^6$ is hydrogen or methyl, is reacted with an olefin of the formula

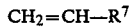

wherein $R^7$ is an alkyl group of 6 to 24 carbon atoms, and with fuming sulfuric acid, in the presence of an organic sulfur trioxide complexing agent in catalytic quantities. Any of the known organic sulfur trioxide complexing agents may be employed, although dimethylformamide is preferred. The reaction can generally be carried out at a temperature of about 30° to 70° C. The acrylamido sulfonic acid can be isolated by precipitation or can be neutralized with a suitable base, such as sodium hydroxide, to form the sulfonate salt.

Alternatively, compounds of forumula (II), above, may be prepared according to the procedure described in commonly assigned copending application, Ser. No. 766,862, now abandoned concurrently herewith, entitled "Process for the Preparation of 2-Acrylamido (or Methacrylamido)-alkyl-1-sulfonic Acids".

According to this procedure, a $C_8$–$C_{26}$ alpha olefin or mixture of alpha olefins is reacted with an excess of acrylonitrile or methacrylonitrile and sulfur trioxide, followed by hydrolysis. Advantageously, the excess acrylonitrile or methacrylonitrile functions both as solvent and sulfur trioxide complexing agent, as well as one of the reactants. Any form of sulfur trioxide may be employed, such as liquid, gas or air flume. Additional solvents which are inert to the reaction may also be used, such as chloroethane, and the like. The reaction is carried out at temperatures in the range of −20° C. to +40° C. for a period of about 2 to 16 hours. The acrylamido or methacrylamido sulfonic acid is isolated by conventional techniques. Neutralization of the sulfonic acid with a suitable base, such as sodium hydroxide, provides the sulfonate salt.

The copolymerizable ionic surfactant is copolymerized with the acrylamide and acrylic acid or acrylic acid salt monomers according to any of the known conventional polymerization techniques to form the terpolymers of the invention. In general, the ionic surfactant is added with stirring to an aqueous solution of a mixture of acrylamide and acrylic acid or acrylic acid salt. The terpolymer can also be prepared by any desired solution polymerization method or emulsion polymerization method, wherein a non-water miscible, neutral organic solvent, in addition to water, can be employed as the polymerization media. The most effective terpolymers are prepared by copolymerizing the ionic surfactant with the acrylamide/acrylate mixture in a molar ratio of surfactant:acrylamide:acrylate in the range of about 0.1–5 : 50–98 : 1.9–49.9, and preferably in the range of about 0.1–1.0 : 65–85 : 14.9–34.9.

The polymerization is effectively carried out in the presence of a suitable catalyst or polymerization initiator capable of generating free radicals. In addition, a chain transfer agent may optionally be included in the polymerization reaction mixture to control the molecular weight of the polymer.

Exemplary suitable polymerization initiators include the inorganic persulfates such as potassium persulfate, ammonium persulfate and sodium persulfate, with or without the presence of copper sulfate; azo catalysts such as azobisisobutyronitrile and dimethyl azoisobutyrate; organic peroxygen compounds such as benzyl peroxide, t-butyl peroxide, diisopropyl benzene hydroperoxide and t-butyl hydroperoxide; or a redox catalyst system containing a persulfate oxidizing agent and a reducing agent, such as the system of ammonium persulfate as the oxidizing catalyst and sodium metabisulfate as the reducing agent.

The water thickening polymers are readily recovered from the aqueous medium when such is desired by removal of water under vacuum or by azeotropic distillation. Alternatively, such polymers may be separated by the addition of methanol or anhydrous acetone to cause the polymer to form a phase separate from the aqueous medium. As a further alternative, the aqueous medium containing the polymer can be used as such.

Preferred random terpolymers of the instant invention can be respresented by the following structural formula:

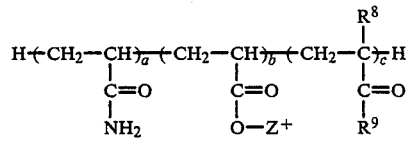

wherein Z is alkali metal or ammonium; $R^8$ is hydrogen or methyl; $R^9$ is selected from the group consisting of

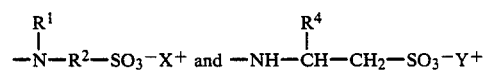

wherein $R^1$ is a hydrophobic group selected from the group consisting of $C_6$–$C_{24}$ alkyl, $C_7$–$C_{24}$ arylalkyl, $C_7$–$C_{24}$ alkylaryl and $C_6$–$C_{24}$ fluoroalkyl; $R^2$ is alkylene of 2 to 4 carbon atoms; $R^4$ is a $C_6$–$C_{24}$ alkyl; and X and Y are each alkali metal or ammonium; and the molar rati of a:b:c is 50–98:1.9–49.9:0.1–5.0.

The amount of water thickening terpolymer in the aqueous medium being thickened is sufficient to provide the desired increase in viscosity of the aqueous medium. Generally, such amounts of water thickening terpolymer will range from about 250 to 5000 ppm (0.025 to 0.50 weight percent), preferably from 250 to 2500 ppm (0.025 to 0.25 weight percent), most preferably from 500 to 2000 ppm (0.05 to 0.20 weight percent), based on the aqueous medium. In addition, to the thickening terpolymer, the aqueous medium may contain a variety of other ingredients common to brines, fracturing fluids, drilling muds, paint formulations, lubricants, friction-reducing agents, suspending agents, surfactants, crude oil liquid mobility control agents, hydraulic fluids and the like.

Of particular interest are the brines and other aqueous media containing salts of various metals. Such aqueous media often contain from 0.01 to 20 weight percent of salts of alkali metals and alkaline earth metals.

The following examples are provided to illustrate the invention in accordance with the principles of this invention, but are not to be construed as limiting the invention in any way except as indicated by the appended claims.

EXAMPLES

Example 1

Synthesis of Sodium-N-(Butyl-4-Sulfonate)-Dodecyl Amine

For this example, 13.6 parts of 1,4-butane sultone and 74 parts of dodecyl amine were dissolved in 200 parts of benzene and the mixture was refluxed for 24 hours. Then, 8 parts of 50% sodium hydroxide was added with mixing and the solution cooled back slowly to room temperature. A crystalline product was collected by filtration and recrystallized from a 10:1 benzene/methanol solution to give 28.22 parts of sodium-N-(butyl-4-sulfonate)-dodecyl amine. The structure was confirmed by C,H,N,S elementary analysis, NMR and IR.

EXAMPLE 2

Synthesis of Sodium Acrylamido-N-Dodecyl-N-(Butyl-4-Sulfonate)

For this example, 10 parts of sodium-N-(butyl-4-sulfonate)-dodecyl amine was added to 25 ml of water and stirred until a smooth, thick solution was formed. The mixture was chilled to 5° C. in an ice bath and 6 parts of acrylyl chloride was added slowly, followed by 2.9 parts of a 50% sodium hydroxide solution to keep the pH at 7-8. The solution was allowed to stir for another 4 hours and 11.5 parts of product was isolated by filtration, followed by vacuum drying. C,H,N,S elementary analysis, NMR and IR confirmed the product as sodium acrylamido-N-dodecyl-N-(butyl-4-sulfonate).

EXAMPLE 3

Synthesis of Sodium-N-(Propyl-3-Sulfonate)-Dodecyl Amine

The procedure of Example 1 is followed, except that 1,3-propane sultone is used instead of 1,4-butane sultone. The product obtained is sodium-N-(propyl-3-sulfonate)-dodecyl amine.

EXAMPLE 4

Synthesis of Sodium Methacrylamido-N-Dodecyl-N-(Propyl-3-Sulfonate)

The procedure of Example 2 is followed, except that sodium-N-(propyl-3-sulfonate)-dodecyl amine is used instead of sodium-N-(butyl-4-sulfonate)-dodecyl amine and methacrylyl chloride is used instead of acrylyl chloride. The product obtained is sodium methacrylamido-N-dodecyl-N-(propyl-3-sulfonate).

EXAMPLE 5

Synthesis of 2-Methacrylamido-Hexadecyl-1-Sulfonic Acid

For this example, 22.4 parts of 1-hexadecene and 67 parts of methacrylonitrile were chilled to 0° C. and 8.8 parts of sulfur trioxide was added to the solution at 0° C. over a period of 45 minutes under vigorous stirring. The solution was allowed to stand for an additional 2 hours at 0° C. and 2.1 parts of water was added slowly to the solution with good mixing. Then 19.4 parts of a solid product was collected by filtration followed by a methacrylonitrile rinse. C,H,N,S elementary analysis, NMR and IR confirmed that the product was 2-methacrylamido-hexadecyl-1-sulfonic acid.

EXAMPLE 6

Synthesis of 2-Acrylamido-Hexadecyl-1-Sulfonic Acid

The procedure of Example 5 was followed, except that 53 parts of acrylonitrile were used instead of methacrylonitrile, and 20 parts of methylene chloride was added. The product isolated, 2-acrylamido-hexadecyl-1sulfonic acid, was confirmed by C,H,N,S elementary analysis, NMR and IR.

EXAMPLE 7

Copolymerization of Acrylic Acid, Acrylamide and Sodium Acrylamido-N-Dodecyl-N-(Butyl-4-Sulfonate)

For this example, 5 parts of acrylic acid, 20 parts of acrylamide, 0.5 parts of a 1.25 weight percent AZO-BIS (isobutyronitrile) solution in tertiary-butanol, and 1.25 parts of an acetic acid solution freshly prepared by mixing 16 parts of acetic acid, 2 parts of pentapotassium triaminodiethylenepentaacetate (Versenex-80, Dow Chemical Co.), and 82 parts of water, were added to polyethylene bottle and water was added to make up a 250 g solution. The solution was degassed by purging nitrogen for 1 hour and then 0.4 parts of sodium acrylamido-N-dodecyl-N-(butyl-4-sulfonate) was added. The bottle was sealed and heated at 60° for 20 hours in a shaker to give a 10% aqueous polymer gel (Polymer I), containing 1.6 weight percent or 0.6 mole percent of the sulfonate surfactant, based on the polymer weight.

EXAMPLE 8

Copolymer Preparation

The procedure of Example 7 was followed, except that only 0.3 parts of sodium acrylamido-N-dodecyl-N-(butyl-4-sulfonate) was added. The product obtained was a 10% aqueous polymer gel (Polymer II), containing 1.2 weight percent or 0.45 mole percent of the sulfonate surfactant, based on the polymer weight.

EXAMPLE 9

Copolymer Preparation

The procedure of Example 7 was followed, except that only 0.2 parts of sodium acrylamido-N-dodecyl-N-(butyl-4-sulfonate) was added. The product obtained was a 10% aqueous polymer gel (Polymer III), containing 0.8 weight percent or 0.3 mole percent of the sulfonate surfactant, based on the polymer weight.

EXAMPLE 10 (COMPARATIVE)

Copolymer Preparation

The procedure of Example 7 was followed, except that 0.4 parts of N-dodecyl acrylamide was added instead of sodium acrylamido-N-dodecyl-N-(butyl-4-sulfonate). The product obtained was a polymer containing only hydrophobic side chains and no ionic surfactant side chains (Polymer IV).

EXAMPLE 11 (COMPARATIVE)

Copolymer Preparation

The procedure of Example 7 was followed, except that 0.4 parts of Neodol 23-6.5 methacrylate was added instead of sodium acrylamido-N-dodecyl-N-(butyl-4-sulfonate). The product obtained was a polymer containing only nonionic surfactant side chains (Polymer V).

EXAMPLE 12 (COMPARATIVE)

Copolymer Preparation

The procedure of Example 7 was followed, except that the 0.4 parts of sodium acrylamido-N-dodecyl-N-(butyl-4-sulfonate) was not added until after the polymerization was completed. The product obtained was an acrylamide-acrylic acid copolymer containing an external surfactant (Polymer VI).

EXAMPLE 13

Copolymerization of Acrylamide, Acrylic Acid and 2-methacrylamido-hexadecyl-1-sulfonic Acid The procedure of Example 7 was followed, except that 0.1 part of 2-methacrylamido-hexadecyl-1-sulfonic acid was used instead of 0.4 parts of sodium acrylamido-N-dodecyl-N-(butyl-4-sulfonate). The product obtained was a 10% aqueous polymer gel (Polymer VII), containing 0.4 weight percent or 0.15 mole percent of the sulfonate surfactant, based on the polymer weight.

EXAMPLE 14

Copolymerization of Acrylamide, Acrylic Acid and acrylamido-hexadecyl-1-sulfonic acid The procedure of Example 13 was followed, except that 0.1 part of 2-acrylamido-hexadecyl-1-sulfonic acid was used instead of 2-methacrylamido-hexadecyl-1-sulfonic acid. The product obtained was a 10% aqueous polymer gel (Polymer VIII), containing 0.4 weight percent or 0.15 mole percent of the sulfonate surfactant, based on the polymer weight.

EXAMPLE 15

Copolymerization of Acrylamide, Sodium Acrylate and 2-methacrylamido-hexadecyl-1-sulfonic acid The procedure of Example 13 was followed, except that 6.5 parts of sodium acrylate was used instead of 5 parts of acrylic acid. The product obtained was a 10% aqueous polymer gel (Polymer IX), containing 0.4 weight percent or 0.15 mole percent of the sulfonate surfactant, based on the polymer weight.

EXAMPLE 16

Polymer Solution Preparation

The polymer gels of Polymers I to IX were cut into 2 mm diameter chunks and stirred in desirable amounts of deionized water for 24 hours or until the gels were totally dissolved. The pH was then adjusted to 7-7.5 with 0.5N sodium hydroxide to provide the neutralized polymers. Viscosity measurements were carried out on the neutralized polymers.

EXAMPLE 17

Polymer Viscosity in Sodium Chloride Solutions

The viscosity of 1500 ppm polymer solutions was measured by a Brookfield viscometer with a UL adaptor. Comparative Polymers IV, V and VI, after neutralization, all showed viscosities equal to or lower than the control, Cyanatrol 960, at all salt concentrations tested. By comparison, Polymers I, VII and VIII, after neutralization, had significantly higher viscosities than Cyanatrol 960 at high salt concentration. See Table I. Cyanatrol 960 is a partially hydrolyzed polyacrylamide, available from American Cyanamid Company.

TABLE I

| | Polymer Viscosity, Centipoise (Cp) | | | |
|---|---|---|---|---|
| % NaCl | Polymer I | Polymer VII | Polymer VIII | Cyanatrol 960 |
| 0 | 480 | 1080 | 1360 | >2,000 |
| 0.01% | 275 | 480 | 680 | >1,000 |
| 0.1% | 82 | 64 | 77 | 180 |
| 0.5% | 175 | 25 | 52 | 35 |
| 1.0% | 87 | 20 | 40 | 24 |
| 3.5% | 58 | 15 | 25 | 14 |
| 10% | 30 | 23 | 25 | 11 |
| 20% | 29 | 29 | 26 | 12 |
| 30% | 32 | 26 | 21 | 13 |

EXAMPLE 18

Polymer Viscosity in Formation Brine

A portion of Polymer I was dissolved and neutralized in a synthetic brine simulating Coyote West oil field reservoir water which has a total dissolved salt concentration of 15,000 ppm and a hardness of 500 ppm. At a polymer concentration of 1500 ppm, Polymer I showed a viscosity of 64 Cp on the Brookfield viscometer, whereas the control, Cyanatrol 960, showed a viscosity of only 14 Cp, at a fixed shear rate of 30 seconds$^{-1}$.

EXAMPLE 19

Polymer Filterability

The time required for 100 cc of a 1500 ppm solution of polymer in fresh water to pass through a 5-micron millipore filter under 20 psi pressure was measured. In this test Polymer I took 36 seconds, whereas the control, Cyanatrol 960, took 388 seconds.

EXAMPLE 20

Polymer Viscosity as a Function of Shear Rate

The thixotropic shear thinning behavior of Polymer I was studied by measuring the viscosity as a function of shear rate for a 1500-ppm solution in simulated Coyote West oil field injection water. As demonstrated in Table III, Polymer I exhibited far more shear thinning than the control polymer Cyanatrol 960.

More specifically, Table III shows that Polymer I has a high viscosity at a low shear rate and a 10-fold decrease in viscosity at a high shear rate. This effect is particularly advantageous in enhanced oil recovery applications, which require high viscosities at low shear rates and low viscosities at high shear rates. By comparison, the control polymer Cyanatrol 960, does not demonstrate this effect. In fact, Cyanatrol 960 shows no significant change in viscosity at varying shear rates.

TABLE III

Polymer Viscosity as a Function of Shear Rate

| Shear Rate, $S^{-1}$ | Polymer I Viscosity, Cp | Cyanatrol 960 Viscosity, Cp |
|---|---|---|
| 6 | 325 | 16 |
| 9 | 190 | — |
| 15 | 115 | 14 |
| 21 | 85 | — |
| 30 | 64 | 12 |
| 40 | 53 | 11 |
| 100 | 30 | 9 |

EXAMPLE 21

Effect of the Level of Copolymerizable Surfactant on Polymer Viscosity

Polymers I, II and IIi were neutralixed and their viscosities compared at 2,000 ppm polymer solutions. Table IV shows that, at high salt concentraion, a higher viscosity is observed, the greater then level of surfactant concentration in the polymer.

TABLE IV

Viscosity as a Function of Surfactant Level in Polymer

| | Viscosity, Cp | | |
|---|---|---|---|
| % NaCl | Polymer I (0.6 Mole % Surfactant) | Polymer II (0.45 Mole % Surfactant) | Polymer III (0.3 Mole % Surfactant) |
| 0 | >1,000 | >1,000 | — |
| 0.01 | 976 | 520 | 375 |
| 0.1 | 720 | 115 | — |
| 0.5 | >1,000 | 86 | 47 |
| 1.0 | >1,000 | 125 | 37 |
| 3.5 | >1,000 | >1,000 | 40 |
| 10 | 464 | — | 50 |
| 20 | 544 | — | 125 |
| 30 | 528 | — | 88 |

EXAMPLE 22

Polyerm Viscosity as a Function of Polymer Concentration

Polymer I was diluted into 1000-, 1500- and 2000-ppm solutions, neutralized to pH 7, and viscosity measurements were taken over a wide range of sodium chloride concentrations. As shown in Table V, Polymer I exhibited a much stronger polymer concentration effect on viscosity than the control, Cyanatrol 960.

TABLE V

Viscosity as a Function of Polymer Concentration

| | Polymer I Viscosity, Cp | | | Cyanatrol 960 Viscosity, Cp | | |
|---|---|---|---|---|---|---|
| % NaCl | 1000 ppm | 1500 ppm | 2000 ppm | 1000 ppm | 1500 ppm | 2000 ppm |
| 0 | 360 | 480 | >1000 | — | >1000 | >2000 |
| 0.01 | 170 | 270 | 976 | 320 | >1000 | >1000 |
| 0.1 | 42 | 75 | 720 | 82 | 160 | 500 |
| 0.5 | 43 | 170 | >1000 | 21 | 33 | 65 |
| 1.0 | 33 | 85 | >1000 | 14 | 23 | 43 |
| 3.5 | 20 | 56 | >1000 | 9 | 13 | 23 |
| 10 | 12 | 27 | 464 | 7 | 11 | 18 |
| 20 | 12 | 27 | 544 | — | 12 | 19 |
| 30 | 13 | 30 | 528 | 6.4 | 13 | 22 |

What is claimed is:

1. A water thickening terpolymer of polymerized units of
   (A) about 50 to 98 mole percent of acrylamide;
   (B) about 1.9 to 49.9 mole percent of an alkali meal salt or ammonium salt of acrylic acid; and
   (C) about 0.1 to 5 mole percent of a copolymerizable ionic surfactant selected from compounds of the formulae

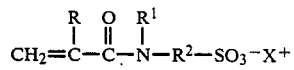

and

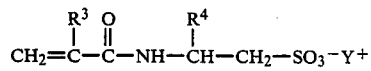

wherein R and $R^3$ are each hydrogen or methyl; $R^1$ is a hydrophobic group selected from the group consisting of $C_6$-$C_{24}$ alkyl, $C_7$-$C_{24}$ arylalkyl, $C_7$-$C_{24}$ alkylaryl, and $C_6$-$C_{24}$ fluoroalkyl; $R^2$ is alkylene of 2 to 4 carbon atoms; $R^4$ is $C_6$-$C_{24}$ alkyl; and X and Y are each hydrogen, alkali metal or ammonium.

2. The terpolymer according to claim 1, wherein the copolymerizable ionic surfactant is

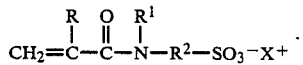

3. The terpolymer according to claim 2, wherein $R^1$ is $C_6$-$C_{24}$ alkyl.

4. The terpolymer according to claim 3, wherein $R^1$ is $C_{10}$-$C_{18}$ alkyl.

5. The terpolymer according to claim 2, wherein X is sodium.

6. The terpolymer according to claim 2, wherein the copolymerizable ionic surfactant is sodium acrylamido-N-dodecyl-N-(butyl-4-sulfonate).

7. The terpolymer according to claim 1, wherein Component (B) is sodium acrylate and Component (C) is sodium acrylamido-N-dodecyl-N-butyl-4-sulfonate.

8. The terpolymer according to claim 1, wherein the copolymerizable ionic surfactant is

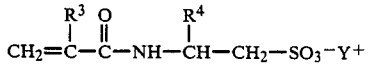

9. The terpolymer according to claim 8, wherein $R^4$ is $C_{10}$-$C_{18}$ alkyl.

10. The terpolymer according to claim 8, wherein Y is sodium.

11. The terpolymer according to claim 8, wherein the copolymerizable ionic surfactant is sodium 2-acrylamido-hexadecyl-1-sulfonate.

12. The terpolymer according to claim 8, wherein the copolymerizable ionic surfactant is sodium 2-methacrylamido-hexadecyl-1-sulfonate.

13. The terpolymer according to claim 1, wherein Component (B) is sodium acrylate and Component (C) is sodium 2-acrylamido-hexadecyl-1-sulfonate.

14. The terpolymer according to claim 1, wherein Component (B) is sodium acrylate and Component (C) is sodium 2-methacrylamido-hexadecyl-1-sulfonate.

15. The terpolymer according to claim 1, which is a terpolymer of polymerized units of about 65 to 85 mole percent of Component (A), about 14.9 to 34.9 mole percent of Component (B) and about 0.1 to 1.0 mole percent of Component (C).

16. An aqueous composition comprising an aqueous medium having dispersed therein about 250 to 5000 ppm of the terpolymer of claim 1.

17. A random terpolymer of the formula

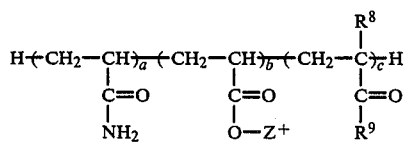

wherein Z is alkali metal or ammonium; $R^8$ is hydrogen or methyl;

$R^9$ is selected from the group consisting of

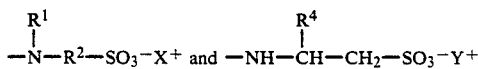

wherein $R^1$ is a hydrophobic group selected from the group consisting of $C_6$-$C_{24}$ alkyl, $C_7$-$C_{24}$ arylalkyl, $C_7$-$C_{24}$ alkylaryl, and $C_6$-$C_{24}$ fluoroalkyl; $R^2$ is alkylene of 2 to 4 carbon atoms; $R^4$ is $C_6$-$C_{24}$ alkyl; and X and Y are each alkali metal or ammonium; and the molar ratio of a:b:c is 50–98:1.9–49.9:0.1–5.0.

18. The terpolymer according to claim 17, wherein $R^9$ is

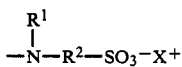

19. The terpolymer according to claim 18, wherein $R^1$ is $C_6$-$C_{24}$ alkyl.

20. The terpolymer according to claim 19, wherein $R^1$ is $C_{10}$-$C_{18}$ alkyl.

21. The terpolymer according to claim 18, wherein $R^1$ is dodecyl, $R^2$ is butylene, $R^8$ is hydrogen, and X and Z are both sodium.

22. The terpolymer according to claim 17, wherein $R^9$ is

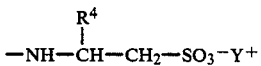

23. The terpolymer according to claim 22, wherein $R^4$ is $C_{10}$-$C_{18}$ alkyl.

24. The terpolymer according to claim 22, wherein $R^4$ is hexadecyl, $R^8$ is hydrogen, and Y and Z are both sodium.

25. The terpolymer according to claim 22, wherein $R^4$ is hexadecyl, $R^8$ is methyl, and Y and Z are both sodium.

26. The terpolymer according to claim 17, wherein the molar ratio of a:b:c is 65–85:14.9–34.9:0.1–1.0.

* * * * *